United States Patent
Montgomery et al.

(10) Patent No.: US 11,288,654 B1
(45) Date of Patent: Mar. 29, 2022

(54) DEVICES AND METHODS FOR PROVIDING CARD TRANSACTION FEEDBACK FOR HEARING OR VISUAL IMPAIRED

(71) Applicant: Capital One Services, LLC, McLean, VA (US)

(72) Inventors: James Montgomery, McLean, VA (US); David Harrington, Arlington, VA (US); Jonathan Rider, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/110,483

(22) Filed: Dec. 3, 2020

(51) Int. Cl.
*G06Q 20/32* (2012.01)
*G06F 3/01* (2006.01)
*G06Q 20/34* (2012.01)
*G09B 21/00* (2006.01)

(52) U.S. Cl.
CPC ......... *G06Q 20/3223* (2013.01); *G06F 3/016* (2013.01); *G06Q 20/3563* (2013.01); *G09B 21/003* (2013.01); *G09B 21/009* (2013.01)

(58) Field of Classification Search
CPC ............ G06Q 20/3223; G06Q 20/3563; G06F 3/016; G09B 21/003; G09B 21/009
See application file for complete search history.

(56) References Cited

U.S. PATENT DOCUMENTS

| | | | |
|---|---|---|---|
| 9,070,262 B2 | 6/2015 | Fadell et al. | |
| 9,202,355 B2 | 12/2015 | Hill | |
| 9,235,967 B1 * | 1/2016 | Magee | G06Q 20/1085 |
| 10,064,042 B2 | 8/2018 | Aoki | |
| 10,216,231 B1 | 2/2019 | Landick | |
| 10,489,769 B2 | 11/2019 | Brown et al. | |
| 2003/0128822 A1 * | 7/2003 | Leivo | H04L 63/104 |
| | | | 379/93.02 |
| 2012/0186101 A1 | 7/2012 | Sanchez | |
| 2014/0074696 A1 * | 3/2014 | Glaser | G06Q 20/341 |
| | | | 705/39 |
| 2016/0238040 A1 | 8/2016 | Gallo | |
| 2016/0379205 A1 | 12/2016 | Margadoudakis | |

* cited by examiner

*Primary Examiner* — Tadesse Hailu
(74) *Attorney, Agent, or Firm* — Troutman Pepper Hamilton Sanders LLP; Christopher J. Forstner; John A. Morrissett

(57) ABSTRACT

A card accessory device including, among other things, one or more processors and memory storing instructions that, when executed by the one or more processors, are configured to cause the card accessory device to receive, from a terminal in communication with the card, one or more messages comprising a complete message indicative of successfully reading the card and a read error message indicative that there was an error in reading the card, identify one or more predetermined sequences based on the one or more messages, and perform via a rumble pack, one or more predetermined vibration sequences comprising a first vibration sequence associated with the complete message and a second vibration sequence associated with the read error message in a predetermined pattern.

20 Claims, 3 Drawing Sheets

DEVICES AND METHODS FOR PROVIDING CARD TRANSACTION FEEDBACK FOR HEARING OR VISUAL IMPAIRED

FIELD OF TECHNOLOGY

Examples of the present disclosure relate generally to devices and methods for providing haptic feedback to a user making a transaction, and more specifically to using a payment card accessory device to convert transaction data associated with a payment card transaction into haptic feedback for the user.

BACKGROUND

There are approximately 10 million people in the United States that are hard of hearing and nearly 1 million that are functionally deaf. Additionally, approximately 12 million people 40 years and over in the United States have vision impairment with 1 million who are blind. It is difficult for those with any of these impairments to conduct payment card transactions because there are limited ways to effectively visually convey feedback as to whether the transaction was successful or failed (e.g., due to an error reading the card, insufficient funds, etc.) to a visually impaired user who is using a payment card (e.g., credit card). Similarly, there are limited ways to effectively convey such messages audibly to those hard of hearing or functionally deaf. Thus, a user with any of these impairments might be able to attempt a payment card transaction, but would not know when the transaction was complete or if there was an error in the attempted transaction (and what that error was so they could quickly remedy it).

Accordingly, there is a need for devices that assist users with any of these impairments to enable them to independently conduct payment card transactions more effectively.

Embodiments of the present disclosure are directed to this and other considerations.

SUMMARY

Disclosed herein are devices and methods for providing haptic feedback to a user making a transaction.

Consistent with the disclosed embodiments, a card accessory device including a connector configured to receive at least a first end of a card (e.g., credit card), the first end of the card not containing a chip (e.g., Europay, Mastercard, and Visa (EMV)). The card accessory device may also include an attachment arm extending from the connector, a housing connected to the attachment arm opposite the connector, a rumble pack at least partially contained within the housing, one or more processors, and memory. The memory may store instructions that, when executed by the one or more processors, are configured to cause the card accessory device to receive, from a terminal in communication with the card, one or more messages comprising a complete message indicative of successfully reading the card and a read error message indicative that there was an error in reading the card, identify one or more predetermined sequences based on the one or more messages, and perform via the rumble pack, one or more predetermined vibration sequences comprising a first vibration sequence associated with the complete message and a second vibration sequence associated with the read error message in a predetermined pattern.

Consistent with the disclosed embodiments, a card accessory device may include a connector configured to receive at least a first end of a card, the first end of the card not containing a chip, an attachment arm extending from the connector, a housing connected to the attachment arm opposite the connector, a rumble pack at least partially contained within the housing, a capacitor contained within the housing, the capacitor being configured to accumulate power from an external power source and provide power to the rumble pack, one or more processors, and memory. The memory may store instructions that, when executed by the one or more processors, are configured to cause the card accessory device to receive, from a terminal in communication with the card, one or more messages, identify one or more predetermined sequences based on the one or more messages, direct at least a portion of the power to the rumble pack, and perform, via the rumble pack, one or more predetermined vibration sequences.

Consistent with the disclosed embodiments, a card accessory device including a connector configured to receive at least a first end of a card, the first end of the card not containing a chip, an attachment arm extending from the connector, a housing connected to the attachment arm opposite the connector, a rumble pack at least partially contained within the housing, a battery contained within the housing, the battery being in electrical communication with and configured to provide power to the rumble pack, one or more processors, and memory. The memory may store instructions that, when executed by the one or more processors, are configured to cause the card accessory device to receive, from a terminal in communication with the card, one or more messages, identify one or more predetermined vibration sequences based on the one or more messages, and perform, via the rumble pack, the one or more predetermined vibration sequences.

Further features of the disclosed design, and the advantages offered thereby, are explained in greater detail hereinafter with reference to specific examples illustrated in the accompanying drawings, wherein like elements are indicated with like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
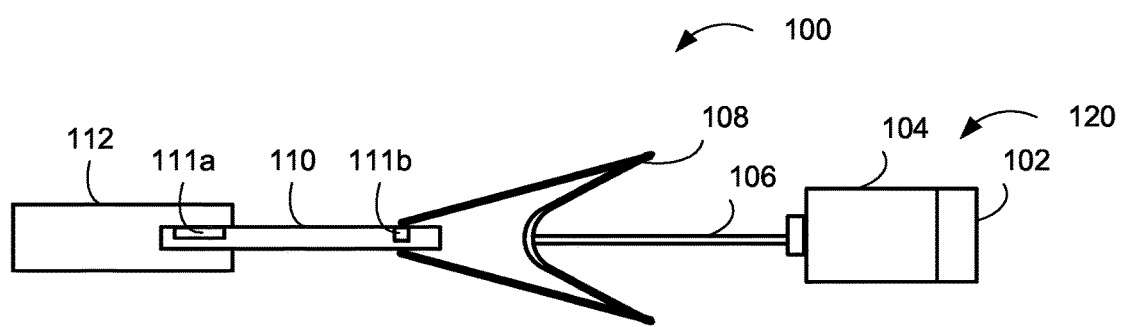
FIG. 1 is a diagram of an example of a card accessory device 100 without a battery, according to some examples of the present disclosure.

Examples of the present disclosure can comprise devices and methods for using a payment card accessory device to convert transaction data associated with a payment card transaction into haptic feedback for the user. As will become apparent, payment card, the card accessory device and the method for can take many forms and can be implemented using many methods and/or devices.

Although certain examples of the disclosed technology are explained in detail, it is to be understood that other examples, embodiments, and implementations of the disclosed technology are contemplated. For example, although referred to in the context of payment cards (e.g., credit and debit cards) it is contemplated that the disclosed technology can be used with cards other than payment cards (e.g., government identification cards, transit cards, access cards, gift cards, etc.). Accordingly, it is not intended that the disclosed technology is limited in its scope to the details of construction and arrangement of components set forth in the following description or illustrated in the drawings. The disclosed technology is capable of other embodiments and of being practiced or carried out in various ways. Such implementations and applications are contemplated within the scope of the present disclosure.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described.

FIG. 1 is a diagram of an example of a card accessory device 100 without a battery, according to some examples of the present disclosure. The card accessory device 100 may be used in conjunction with a payment card 110 containing a chip 111a (e.g., Europay, Mastercard, and Visa (EMV) chip). The card accessory device 100 may have the ability to attach and detach from the payment card 110 using a connector 108. The connector may include a spring or similar resiliency mechanism so that the connect can remain attached to the payment card 110. The connector 108 may attach to an end of the payment card 110 opposite the end of the chip 111a. In some embodiments, the connector may include an electrical contact surface on the contact point of the connector which may contact and mate with an electric contact surface 111b of the payment card 110. Although not shown, the payment card 110 may include a circuit, wire, or other electrical connection between the chip 111a and the electric contact surface 111b.

The card accessory device 100 may also include an attachment arm 106 that connects the connector 108 to a housing 120 of the card accessory device 100. The attachment arm 106 may also include a wire, circuit or other electrical connection between the connector 108 and the housing 120. The housing 120 may include a controller 102 and a rumble pack 104. The rumble pack 104 is controlled by the controller 102 and is configured to provide specific haptic feedback based on the instructions it receives from the controller 102.

Once the connector 108 is attached to the payment card 110 and the payment card is inserted into a payment terminal 112 (e.g., point-of-sale device), power and messages flow from the payment terminal 112 to the controller 102, which then converts the messages to instructions for the rumble pack 104. The rumble pack 104, powered by the payment terminal 112, generates different haptic feedback depending on the message received. For example, if the controller 102 receives a payment complete message from the payment terminal 112, the controller 102 may instruct the rumble pack 104 to initiate a first vibration sequence (e.g., vibrate once for two seconds). As another example, if the controller 102 receives a read error message from the payment terminal 112, the controller 102 may instruct the rumble pack 104 to initiate a second vibration sequence (e.g., vibrate twice for half a second each). As another example, if the controller 102 receives an insufficient funds (or insufficient assets available) message from the payment terminal 112, the controller 102 may instruct the rumble pack to initiate a third vibration sequence (e.g., vibrate three times for one second each).

In some embodiments, the card accessory device 100 may include a sensor that is configured that the connector 108 has received the first end of the payment card 110. The sensor may be a pressure sensor and it may be powered from the payment terminal 112. Once a card is detected by the sensory, the controller 102 may instruct the rumble pack 104 to generate a particular vibration sequence indicating that the card accessory device 100 is connected to a card.

In an embodiment, the card accessory device 100 may form a circuit with the payment card 110 such that the payment terminal 112 can detect when the circuit is completed by the card accessory device. In another embodiment, the card accessory device 100 may form a circuit with the payment card 110 such that the card accessory device 100 (or controller 102) can detect when the circuit is completed by the card accessory device. Once the circuit is formed, the controller 102 may instruct the rumble pack 104 to generate an initiate vibration sequence.

Figure 2:
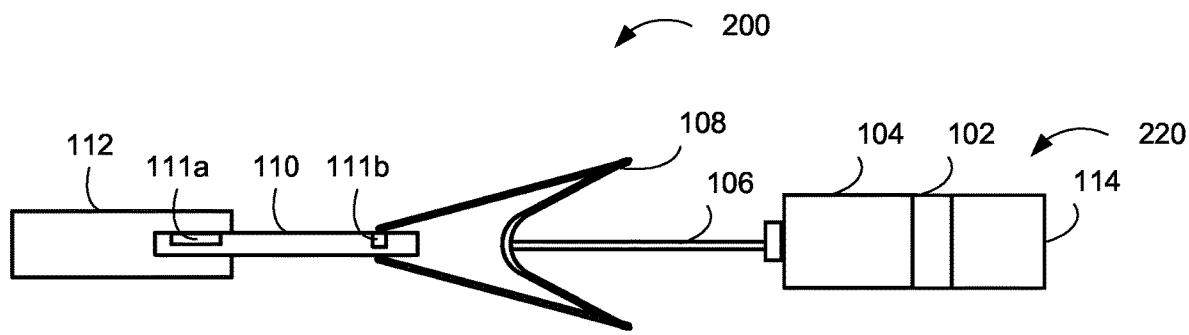
FIG. 2 is a diagram of an example of a card accessory device 200 with a battery and/or a capacitor, according to some examples of the present disclosure.

FIG. 2 is a diagram of an example of a card accessory device 200 with a battery and/or a capacitor, according to some examples of the present disclosure. Card accessory device 200 is similar to the card accessory device 100 shown in FIG. 1 except that card accessory device 200 may include a battery and/or capacitor 114 to power the controller 102 and the rumble pack 104. For brevity, the features of card accessory device 100 that are the same as the features of card accessory device 200 will not be repeated. Instead, the description of card accessory device 100 will be incorporated into the description of card accessory device 200.

In alternative embodiments, the card accessory device may work with contactless payments cards or devices with power supplied by the card (e.g., credit card with induction coils) or the accessory device (e.g., card accessory device with induction coils) or power supplied by a battery or capacitor similar to the card accessory device 220 shown in FIG. 2.

Figure 3:
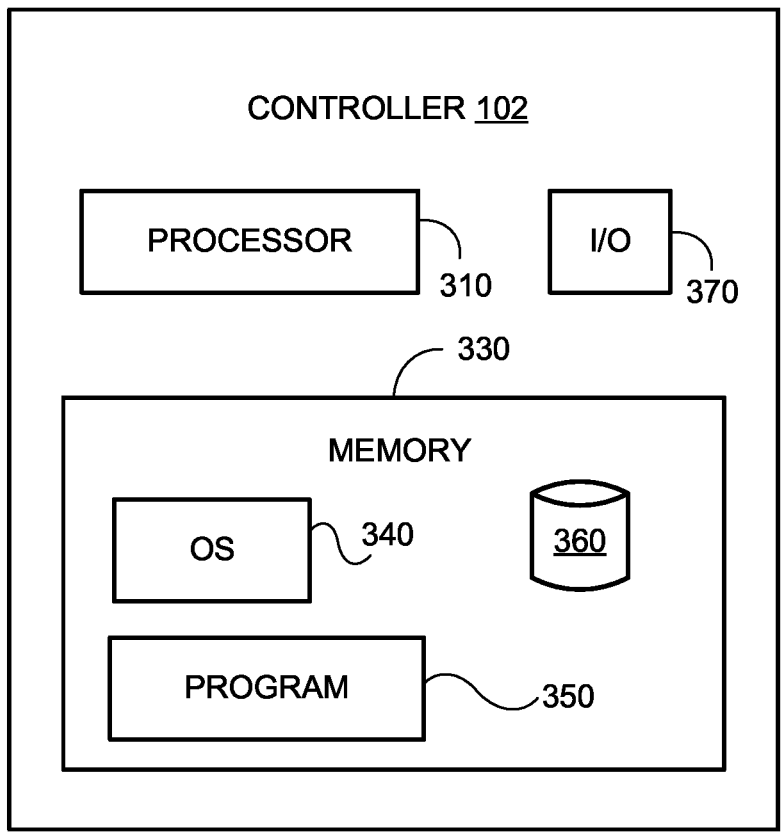
FIG. 3 is a block diagram of an example of controller 102, according to some examples of the present disclosure.

FIG. 3 is a block diagram (with additional details) of the example controller 102, as also depicted in FIGS. 1 and 2. As shown, the controller 102 may include a processor 310, an input/output ("I/O") device 320, a memory 330 containing an operating system ("OS") 340 and a program 350. In some embodiments, the controller 102 may further include a peripheral interface, a transceiver, a mobile network interface in communication with the processor 210, a bus configured to facilitate communication between the various components of the controller 102, and a power source (e.g., via a payment terminal 112 or battery/capacitor 114) configured to power one or more components of the controller 102.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Pentium™ family manufactured by Intel™ or the Turion™ family manufactured by AMD™. The processor 310 may constitute a single core or multiple core processor that executes parallel processes simultaneously. For example, the processor 210 may be a single core processor that is configured with virtual processing technologies. In certain embodiments, the processor 310 may use logical processors to simultaneously execute and control multiple processes. The processor 310 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the controller 102 may include one or more storage devices configured to store information used by the processor 210 (or other components) to perform certain functions related to the disclosed embodiments. In one example, the controller 102 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the controller 102 may include a memory 230 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the controller 102 may include the memory 330 that may include one or more programs 350 to perform one or more functions of the disclosed embodiments. For example, in some embodiments, the controller 102 may additionally manage dialogue and/or other interactions with the customer via a program 350.

The memory 330 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a customer information database 380 for storing related data to enable the controller 102 to perform one or more of the processes and functionalities associated with the disclosed embodiments.

The database 360 may include stored data relating to transactions or presets/preferences associated with vibration sequences for particular messages.

The discrepancy determination device 120 may also be communicatively connected to one or more memory devices (e.g., databases) locally or through a network. The remote memory devices may be configured to store information and may be accessed and/or managed by the discrepancy determination device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The controller 102 may also include one or more I/O devices 220 that may comprise one or more interfaces for receiving signals or input from devices and providing signals or output to one or more devices that allow data to be received and/or transmitted by the controller 102. For example, the controller 102 may include interface components, which may provide interfaces to one or more input devices, such as one or more keyboards, mouse devices, touch screens, track pads, trackballs, scroll wheels, digital cameras, microphones, sensors, and the like, that enable the controller 102 to receive data from one or more users.

In example embodiments of the disclosed technology, the controller 102 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the controller 102 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the controller 102 may include a greater or lesser number of components than those illustrated.

Figure 4:
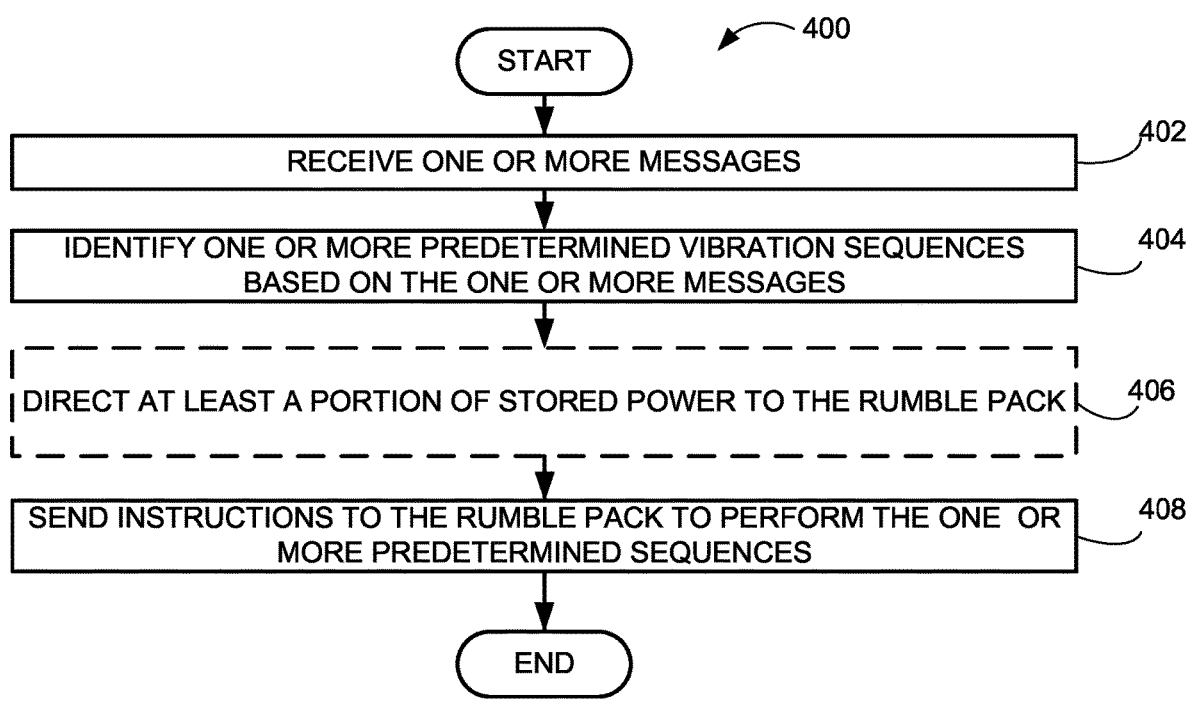
FIG. 4 is a flow diagram 400 of a method for providing haptic feedback for card transactions, according to some examples of the present disclosure.

FIG. 4 is a flow diagram 400 of a method for providing haptic feedback for card transactions, according to some examples of the present disclosure.

In step 402, the controller 102 may receive one or more messages from the payment terminal 112. In step 404, the controller may identify one or more predetermined vibration sequences based on the one or more messages and possibly based on preferences stored in database 360. In optional step 406, the controller 102 may direct a portion of the stored power to the rumble pack to initiate it. In step 408, the controller 102 send instructions to the rumble pack 104 to perform the one or more predetermined vibration sequences. In other words, the card accessory device 100 or 200 performs the one or more vibration sequences.

EXEMPLARY USE CASE

The following example use case describes an example of particular implementations of using a card accessory device with a payment card. This example is intended solely for explanatory purposes and should not be considered as limiting.

Jack, a vision-impaired man, pulls out a credit card and credit card accessory device (e.g., card accessory device 100 or 200) to pay for a new jacket. He feels the credit card to determine which end has an EMV chip and which end has metal contacts. Jack takes the connector portion of the credit card accessory device and attaches it to the metal contacts (the opposite end from the EMV chip) on the credit card. Then Jack places the credit card, with the credit card accessory device attached, into a point-of-sale (POS) terminal to pay for the jacket. The POS terminal denies payment and issues an insufficient funds message on a display of the POS terminal Jack cannot read. However, Jack left his hand on the credit card accessory device while the POS terminal read and processed the credit card and he feels three one second long vibrations with a short pause between them from the rumble pack found in the housing of the credit card accessory device. Recognizing this predetermined vibration sequence, Jack can reposition the credit card to again attempt the transaction.

On the system side, when the POS terminal denied payment and displayed an insufficient funds message, it simultaneously (or near simultaneously) transmitted the insufficient funds message and, if the card accessory device does not include a power source (e.g., as shown in FIG. 1), power to a controller of the credit card accessory device through the EMV chip of the credit card, the metal contacts of the credit card, and the connector of the credit card accessory device. The controller, now powered by the POS terminal via the credit card, sends instructions to a rumble pack of the credit card accessory device to generate a vibration sequence associated with the insufficient funds message. The rumble pack, also powered by the POS terminal via the credit card, generates three one second long vibrations with a short pause between them.

What is claimed is:

1. A card accessory device comprising:
a connector configured to receive at least a first end of a card, the first end of the card not containing a chip;
an attachment arm extending from the connector;
a housing connected to the attachment arm opposite the connector;
a rumble pack at least partially contained within the housing;
one or more processors; and
memory storing instructions that, when executed by the one or more processors, are configured to cause the card accessory device to:
receive, from a terminal in communication with the card, one or more messages comprising a complete message indicative of successfully reading the card and a read error message indicative that there was an error in reading the card;
identify one or more predetermined sequences based on the one or more messages; and
perform via the rumble pack, one or more predetermined vibration sequences comprising a first vibration sequence associated with the complete message and a second vibration sequence associated with the read error message in a predetermined pattern.

2. The card accessory device of claim 1 further comprising a battery contained within the housing, the battery being in electrical communication with and configured to provide power to the rumble pack.

3. The card accessory device of claim 1 further comprising a capacitor contained within the housing, the capacitor being configured to accumulate power from an external power source and provide power to the rumble pack.

4. The card accessory device of claim 3, wherein the instructions, when executed by the one or more processors, are further configured to cause the card accessory device to:
accumulate, via the capacitor, power from the external power source responsive to receiving the one or more messages; and
provide at least a portion of the power to the rumble pack to perform the one or more predetermined vibration sequences.

5. The card accessory device of claim 4, wherein:
the connector comprises an electrical contact surface configured to contact a mating electrical contact surface of the card; and
the external power source is associated with the terminal and supplies power through the chip of the card and on to the electrical contact surface of the connector.

6. The card accessory device of claim 5, wherein the card accessory device forms a circuit with the card and the terminal such that the terminal can detect when the circuit is completed by the card accessory device.

7. The card accessory device of claim 1, further comprising a sensor, wherein the instructions, when executed by the one or more processors, are further configured to cause the card accessory device to:

detect, via the sensor, that the connector of the card accessory device has received the first end of the card; and provide an indication of the detection to the card.

8. The card accessory device of claim 7, wherein the sensor is a pressure sensor.

9. A card accessory device comprising:
a connector configured to receive at least a first end of a card, the first end of the card not containing a chip;
an attachment arm extending from the connector;
a housing connected to the attachment arm opposite the connector;
a rumble pack at least partially contained within the housing;
a capacitor contained within the housing, the capacitor being configured to accumulate power from an external power source and provide power to the rumble pack;
one or more processors; and
memory storing instructions that, when executed by the one or more processors, are configured to cause the card accessory device to:
receive, from a terminal in communication with the card, one or more messages;
identify one or more predetermined sequences based on the one or more messages;
direct at least a portion of the power to the rumble pack; and
perform, via the rumble pack, one or more predetermined vibration sequences.

10. The card accessory device of claim 9, wherein:
the connector comprises an electrical contact surface configured to contact a mating electrical contact surface of the card; and
the external power source is associated with the terminal and supplies power through the chip of the card and on to the electrical contact surface of the connector.

11. The card accessory device of claim 9, wherein:
the one or more messages comprises a complete message indicative of successfully reading the card, and
the one or more predetermined vibration sequences comprises a first vibration sequence associated with the complete message.

12. The card accessory device of claim 9, wherein:
the one or more messages comprises a read error message indicative of an error in reading the card, and
the one or more predetermined vibration sequences comprises a second vibration sequence associated with the read error message.

13. The card accessory device of claim 9, wherein:
the one or more messages comprises an insufficient assets available message indicative of insufficient assets available, and
the one or more predetermined vibration sequences comprises a third vibration sequence associated with the insufficient assets available message.

14. The card accessory device of claim 9, further comprising a sensor, wherein the instructions, when executed by the one or more processors, are further configured to cause the card accessory device to:

detect, via the sensor, that the connector of the card accessory device has received the first end of the card; and provide an indication of the detection to the card.

15. A card accessory device comprising:
a connector configured to receive at least a first end of a card, the first end of the card not containing a chip;
an attachment arm extending from the connector;
a housing connected to the attachment arm opposite the connector;
a rumble pack at least partially contained within the housing;
a battery contained within the housing, the battery being in electrical communication with and configured to provide power to the rumble pack;
one or more processors; and
memory storing instructions that, when executed by the one or more processors, are configured to cause the card accessory device to:
receive, from a terminal in communication with the card, one or more messages;
identify one or more predetermined vibration sequences based on the one or more messages; and
perform, via the rumble pack, the one or more predetermined vibration sequences.

16. The card accessory device of claim 15, wherein:
the one or more messages comprises a complete message indicative of successfully reading the card, and
the one or more predetermined vibration sequences comprises a first vibration sequence associated with the complete message.

17. The card accessory device of claim 15, wherein:
the one or more messages comprises a read error message indicative of an error in reading the card, and
the one or more predetermined vibration sequences comprises a second vibration sequence associated with the read error message.

18. The card accessory device of claim 15, wherein:
the one or more messages comprises an insufficient assets available message indicative of insufficient assets available, and
the one or more predetermined vibration sequences comprises a third vibration sequence associated with the insufficient assets available message.

19. The card accessory device of claim 15, wherein the card accessory device forms a circuit with the card and the terminal such that the terminal can detect when the circuit is completed by the card accessory device.

20. The card accessory device of claim 15, further comprising a sensor, wherein the instructions, when executed by the one or more processors, are further configured to cause the card accessory device to:
detect, via the sensor, that the connector of the card accessory device has received the first end of the card; and provide an indication of the detection to the card.

* * * * *